United States Patent
Gu

(10) Patent No.: US 8,305,492 B2
(45) Date of Patent: Nov. 6, 2012

(54) DUAL BURST LOCKED OSCILLATOR ARCHITECTURE FOR AN ANALOG TELEVISION RECEIVER

(75) Inventor: Yongru Gu, Lake Forest, CA (US)

(73) Assignee: Newport Media, Inc., Lake Forest, CA (US)

( * ) Notice: Subject to any disclaimer, the term of this patent is extended or adjusted under 35 U.S.C. 154(b) by 305 days.

(21) Appl. No.: 12/759,673

(22) Filed: Apr. 13, 2010

(65) Prior Publication Data

US 2011/0249180 A1 Oct. 13, 2011

(51) Int. Cl.
*H04N 9/45* (2006.01)
(52) U.S. Cl. .................................................. 348/506
(58) Field of Classification Search .......... 348/506, 348/505, 508, 521, 524; 375/376, 373, 375, 375/364, 327
See application file for complete search history.

(56) References Cited

U.S. PATENT DOCUMENTS

| | | | | |
|---|---|---|---|---|
| 4,647,968 A | * | 3/1987 | Willis | 348/574 |
| 4,819,196 A | * | 4/1989 | Lilley et al. | 708/3 |
| 5,534,939 A | * | 7/1996 | Nakamura et al. | 348/505 |
| 5,563,914 A | * | 10/1996 | Sogabe | 375/326 |
| 5,600,672 A | * | 2/1997 | Oshima et al. | 375/219 |
| 6,108,485 A | * | 8/2000 | Kim | 386/201 |
| 7,777,813 B2 | * | 8/2010 | Uno et al. | 348/506 |

* cited by examiner

*Primary Examiner* — Paulos Natnael
(74) *Attorney, Agent, or Firm* — Rahman LLC

(57) ABSTRACT

Color information decoding on a composite video signal that includes modulated color information for an analog television receiver. A first burst locked oscillator (BLO) operates in a first loop gain, and a second BLO operates in second loop gain and is operatively connected to the first BLO. The first loop gain is higher than the second loop gain. A method includes receiving, in a first burst accumulator, mixed down color information directly from a first phase detector without filtering the mixed down color information, converting the composite video signal to a burst gate signal, accumulating one or more of the burst gate signal, and calculating a frequency offset for the second BLO in the first BLO expedite the calculating of the frequency offset and to compensate for the second BLO operating in the second loop gain.

20 Claims, 5 Drawing Sheets

DUAL BURST LOCKED OSCILLATOR ARCHITECTURE FOR AN ANALOG TELEVISION RECEIVER

BACKGROUND

1. Technical Field

The embodiments herein generally relate to analog televisions, and, more particularly, to an oscillator architecture for an analog television receiver.

2. Description of the Related Art

Analog television encodes television picture and sound information and transmits it as an analog signal, in which the message conveyed by the broadcast signal is a function of deliberate variations in the amplitude and/or frequency of the signal. All systems preceding digital television, such as NTSC, PAL, or SECAM are analog television systems. In color television systems for NTSC and PAL, color information is modulated with a color sub-carrier tone. In order to decode color information, one must first get synchronized with the color sub-carrier tone. A local color sub-carrier tone in the receiver must be reproduced with the same frequency and phase as the transmitted color sub-carrier tone.

In NTSC and PAL, besides the modulated color information, the TV signal also provides a color burst signal at the beginning of each line. In the receiver, one just needs to get synchronized to the color burst signal in order to correctly decode the color information. The device which performs the task of synchronization to the color burst signal is called a burst locked oscillator (BLO). FIG. 1 illustrates a traditional BLO architecture 100 having a phase detector 104, a low pass filter (LPF) 106, a burst accumulator 108, a BLO controller 110, and a digital voltage controlled oscillator (VCO) 112. The input signal to the BLO 100 is a composite video signal (Color, Video, Blank, and Sync (CVBS)), as well as a burst gate signal from a horizontal and vertical synchronization (HV SYNC) block 102.

The BLO 100 locks to, gets synchronized with, or recovers the reference color sub-carrier tone which is transmitted during the color burst of each line. Then, the recovered color sub-carrier tone mixes down with the received modulated color information. The mixed down color information is finally sent to the LPF 106 to recover the color information. In the traditional BLO 100, it is hard to have good color lock under mobile and noisy conditions at the same time. Thus, there is a need for an improved burst locked oscillator architecture for analog television.

SUMMARY

In view of the foregoing, an embodiment herein provides a method for performing a color information decoding on a composite video signal that includes modulated color information for an analog television receiver that includes a first burst locked oscillator (BLO) operated in a first loop gain, and a second BLO operated in second loop gain operatively connected to the first BLO. The first loop gain is higher than the second loop gain, The method includes receiving, in a first burst accumulator, mixed down color information directly from a first phase detector without filtering the mixed down color information, converting the composite video signal to a burst gate signal, accumulating one or more of the burst gate signal, and calculating a frequency offset for the second BLO when the first BLO operates in the first loop gain.

The method further includes receiving, in a second phase detector, a recovered color sub-carrier tone, and mixing the recovered color sub-carrier tone with the modulated color information. Color information is recovered in a low pass filter from the mixed down color information by decoding the mixed down color information. The frequency offset is calculated in a first BLO controller of the first BLO. The first BLO includes a first digital voltage controlled oscillator (VCO) operatively connected to the first BLO controller and the first phase detector.

The second BLO further includes a second burst accumulator that receives the burst signal from a horizontal and vertical synchronization (HV SYNC) unit. The second BLO includes a second BLO controller that receives the calculated frequency offset from the first BLO controller, and a second digital voltage controlled oscillator (VCO) operatively connected to the second BLO controller. The second digital VCO sends the recovered color sub-carrier tone to the second phase detector.

In another aspect, a dual burst locked oscillator (BLO) architecture for performing a color information decoding on a composite video signal that includes modulated color information for an analog television receiver is provided. The dual BLO architecture includes a first BLO that expedites the color information decoding. The first BLO includes a first burst accumulator that receives a burst gate signal from a horizontal and vertical synchronization (HV SYNC). The HV SYNC converts a composite video signal to the burst gate signal. A first BLO controller operatively connected to the first burst accumulator. The first BLO controller calculates a frequency offset.

A first digital voltage controlled oscillator (VCO) operatively connected to the first BLO controller. A first phase detector operatively connected to the digital VCO and operatively connected to the first burst accumulator. A second BLO operatively connected with the first BLO that performs the color information decoding. The second BLO includes a second burst accumulator that receives the burst gate signal from the HV SYNC, a second BLO controller operatively connected to the second burst accumulator. The second BLO controller receives the frequency offset from the first BLO controller. A second digital VCO operatively connected to the second BLO controller. A second phase detector operatively connected to the second digital VCO and receives a recovered color sub-carrier tone from the second digital VCO. The second phase detector mixes the modulated color information of the CVBS and the recovered color sub-carrier tone to obtain a mixed down color information. A low pass filter (LPF) operatively connected to the second phase detector. The low pass filter recovers color information from the mixed down color information by decoding the mixed down color information.

The first BLO controller and the second BLO controller comprise proportional-integral (PI) controllers. The first BLO is operated in a first loop gain in mobile receiving conditions to expedite the color information decoding. The second BLO is operated in a second loop gain to perform the color information decoding and to provide additional filtering in noisy channels. The first loop gain is greater than the second loop gain. The first phase detector is operatively connected to the first burst accumulator without passing through the LPF. The second BLO controller receives the calculated frequency offset from the first BLO controller. The first BLO operating in the first loop gain expedites the calculation of the frequency offset and compensates for the second BLO operating in the second loop gain.

In yet another aspect, an analog television apparatus is provided. The analog television apparatus includes a receiver that reproduces a local color sub-carrier tone with a same frequency and phase as a transmitted color sub-carrier tone.

The receiver includes a first burst locked oscillator (BLO) operated in a first loop gain, and a second burst locked oscillator (BLO) operated in second loop gain operatively connected to the first BLO. The first loop gain is greater than the second loop gain. The analog television apparatus further includes a memory unit operatively connected to the receiver that includes a programmable set of instructions, a display unit operatively connected to the memory unit, a processor that executes the programmable set of instructions for performing color information decoding on a composite video signal comprising modulated color information.

The processor receives, in a first burst accumulator, a mixed down color information directly from a first phase detector without passing the mixed down color information through a low pass filter (LPF), converts the composite video signal to a burst gate signal, accumulates one or more of the burst gate signal, calculates a frequency offset for the second BLO in the first BLO operating in the first loop gain to expedite the calculating of the frequency offset and to compensate for the second BLO operating in the second loop gain, receives, in a second phase detector, a recovered color sub-carrier tone, mixes the recovered color sub-carrier tone with the modulated color information, and recovers, in a low pass filter, color information from the mixed down color information by decoding the mixed down color information.

The first BLO is operated in the first loop gain in mobile receiving conditions to expedite the color information decoding. The second BLO is operated in the second loop gain to perform the color information decoding and to provide additional filtering in noisy channels. The first BLO operating in the first loop gain expedites the calculation of the frequency offset and compensates for the second BLO operating in the second loop gain. The second BLO includes a second burst accumulator to receive the burst signal from a horizontal and vertical synchronization (HV SYNC) unit. The first BLO includes a first BLO controller operatively connected to the first burst accumulator. The first BLO controller calculates the frequency offset.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
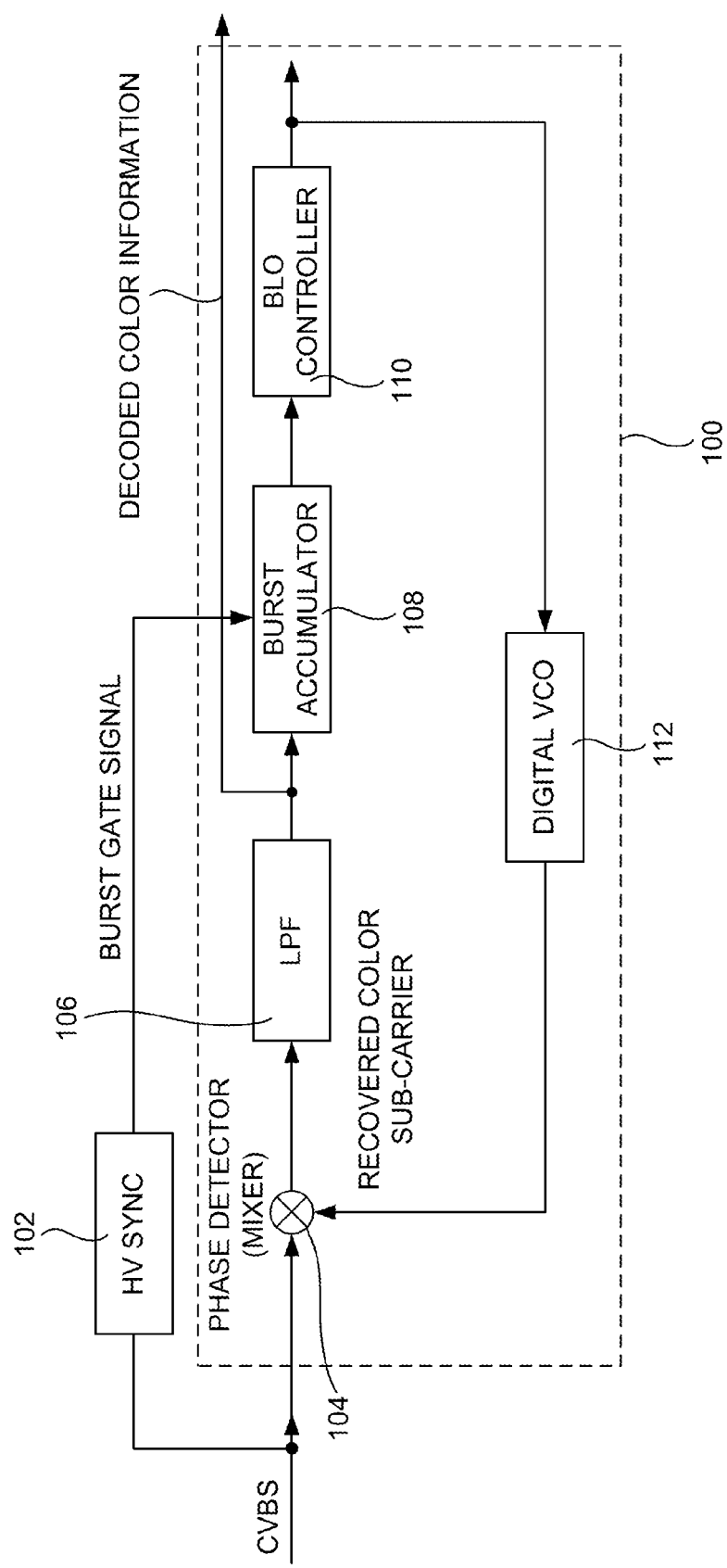
FIG. 1 illustrates a traditional BLO architecture.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a BLO architecture that has good color lock under mobile and noisy conditions at the same time. The embodiments herein achieve this by providing dual BLO architecture 200 for decoding color information and rejecting more noise in a channel for analog television receivers. Referring now to the drawings, and more particularly to FIGS. 2 through 5, where similar reference characters denote corresponding features consistently throughout the figures, there are shown preferred embodiments.

Figure 2:
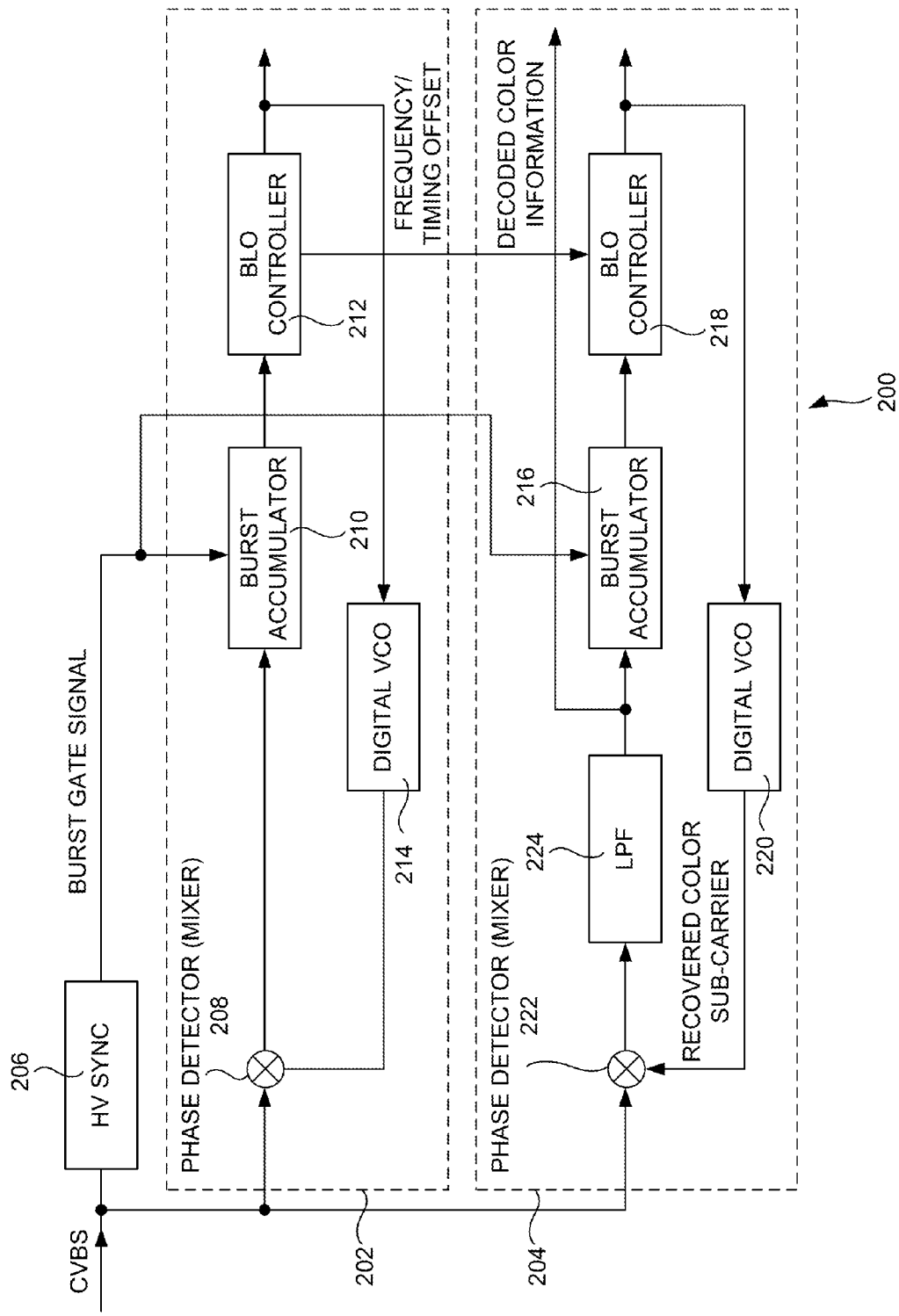
FIG. 2 illustrates a dual BLO architecture according to an embodiment herein.

FIG. 2 illustrates a dual BLO architecture 200 according to an embodiment herein. The dual BLO includes a first BLO unit 202, a second BLO unit 204, and a HV SYNC unit 206. The first BLO unit 202 and the second BLO unit 204 are operatively connected to each other. A CVBS composite video signal having modulated color information is fed as an input to the first BLO unit 202, the second BLO unit 204, and the HV SYNC unit 206. In one embodiment, the first BLO unit 202 is operated in a high loop gain such that the loop gain is approximately 10 to 100, and is programmable. The second BLO unit 204 is operated in a low gain loop gain such that the loop gain is approximately 5 to 20, and is programmable.

The first BLO 202 includes a first phase detector unit 208, a first burst accumulator 210, a first BLO controller 212, and a first digital voltage controlled oscillator (VCO) 214. The first BLO 202 is operated in a high loop gain in high mobile receiving conditions to expedite the color information decoding. The HV SYNC unit 206 converts the composite video signal having the modulated color information to a burst gate signal and passes to the first burst accumulator 210. The first burst accumulator 212 is operatively connected to the HV SYNC 206 and the first phase detector 208.

In one embodiment, the first phase detector 208 is operatively connected to the first burst accumulator 212 without having to pass through a low pass filter. The first burst accumulator 212 accumulates one or more of the burst gate signals. The first BLO controller 212 is operatively connected to the first burst accumulator 212 and calculates a frequency offset. In one embodiment, the first BLO controller 212 comprises proportional-integral (PI) controllers. The first digital VCO 214 is operatively connected to the first BLO controller 212 and the first phase detector 208. The first BLO 202 is operated in a high gain to expedite the calculation of the frequency offset and compensate for the second BLO operating in a low gain.

The second BLO 204 includes a second burst accumulator 216, a second BLO controller 218, and a second digital (VCO) 220, a second phase detector 222, a low pass filter 224. The second burst accumulator 216 is operatively connected to the HV SYNC 206, the second BLO controller 218, and the low pass filter 224. The second burst accumulator 216 receives a burst gate signal from the HV SYNC 206 and accumulates one or more burst gate signals.

The second BLO controller 218 operatively connected to the second digital VCO 220 and the second burst accumulator 216. The second BLO controller 218 receives the calculated frequency offset from the first BLO controller 212. The second BLO controller 218 comprises proportional-integral (PI) controllers. The second digital VCO 220 is operatively connected to the second phase detector 222. The second digital VCO 220 sends a recovered color sub-carrier tone to the second phase detector 222. The second phase detector 222 mixes the received recovered color sub-carrier tone with the modulated color information.

The low pass filter 224 is operatively connected to the second phase detector 222 and the second burst accumulator 216. The low pass filter 224 receives the mixed down color information and recovers color information from the mixed down color information by decoding the mixed down color information. In one embodiment, the recovered color information comprises decoded color information. The second BLO 204 is operated in a low loop gain that performs the color information decoding and provides additional filtering in noisy channels.

Figure 3:
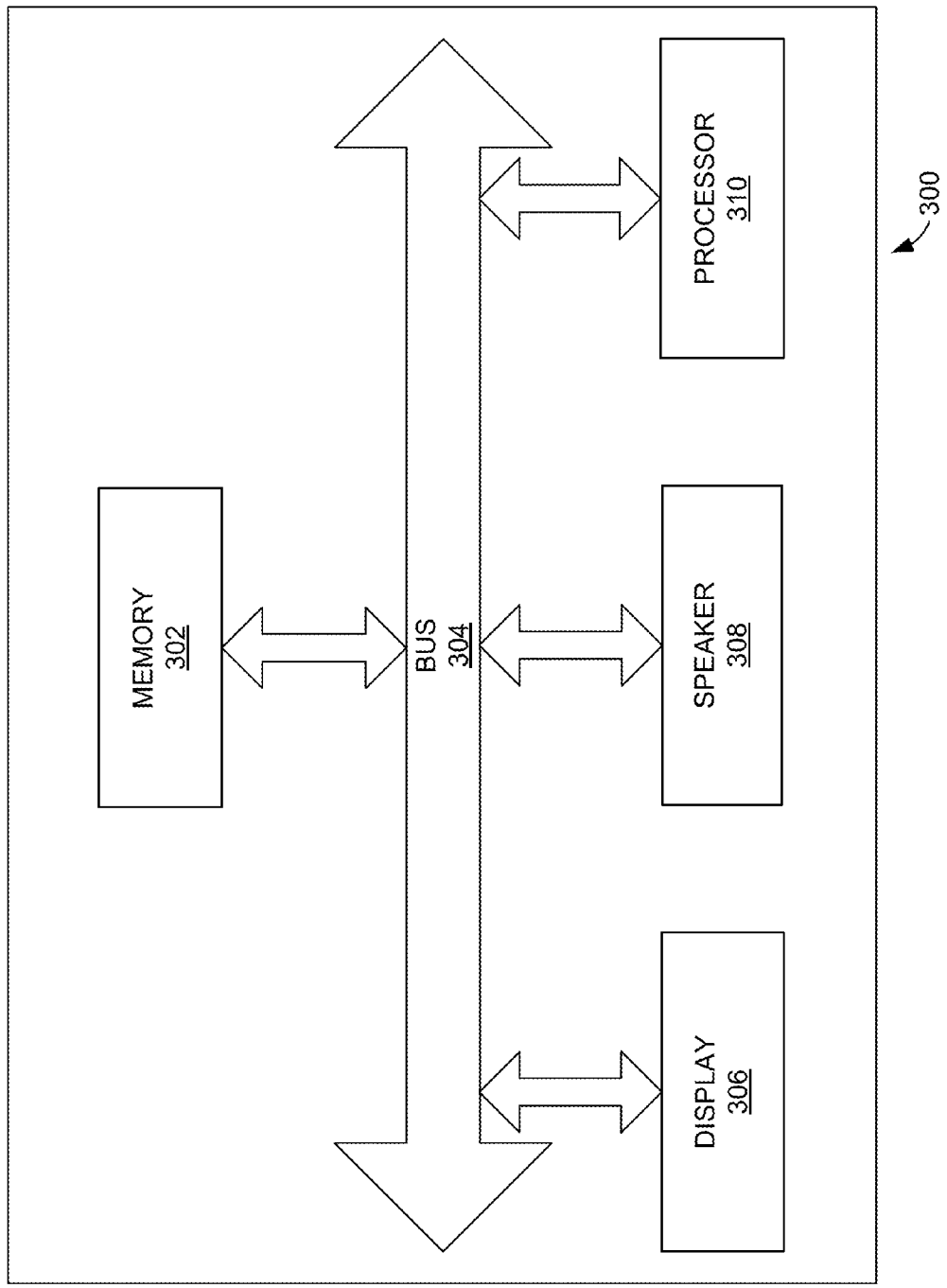
FIG. 3 illustrates an exploded view of an analog television receiver according to an embodiment herein.

FIG. 3 illustrates an exploded view of a receiver 300 having a memory 302 comprising a computer set of instructions. The receiver 300 further includes a bus 304, a display 306, a speaker 308, and a processor 310 capable of processing a set of instructions to perform any one or more of the methodologies herein, according to an embodiment herein. The processor 310 may also enable analog content to be consumed in the form of output via one or more displays 306 or audio for output via speaker and/or earphones 308. The processor 310 may also carry out the methods described herein and in accordance with the embodiments herein. In one embodiment, the processor 310 performs color information decoding on a composite video signal (CVBS) that includes modulated color information. The analog content may also be stored in the memory 302 for future processing or consumption.

A user of the receiver 300 may view this stored information on display 306. When the content is selected, the processor 310 may pass information. The content may be passed among functions within the receiver 300 using bus 304.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can comprise hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/0 controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
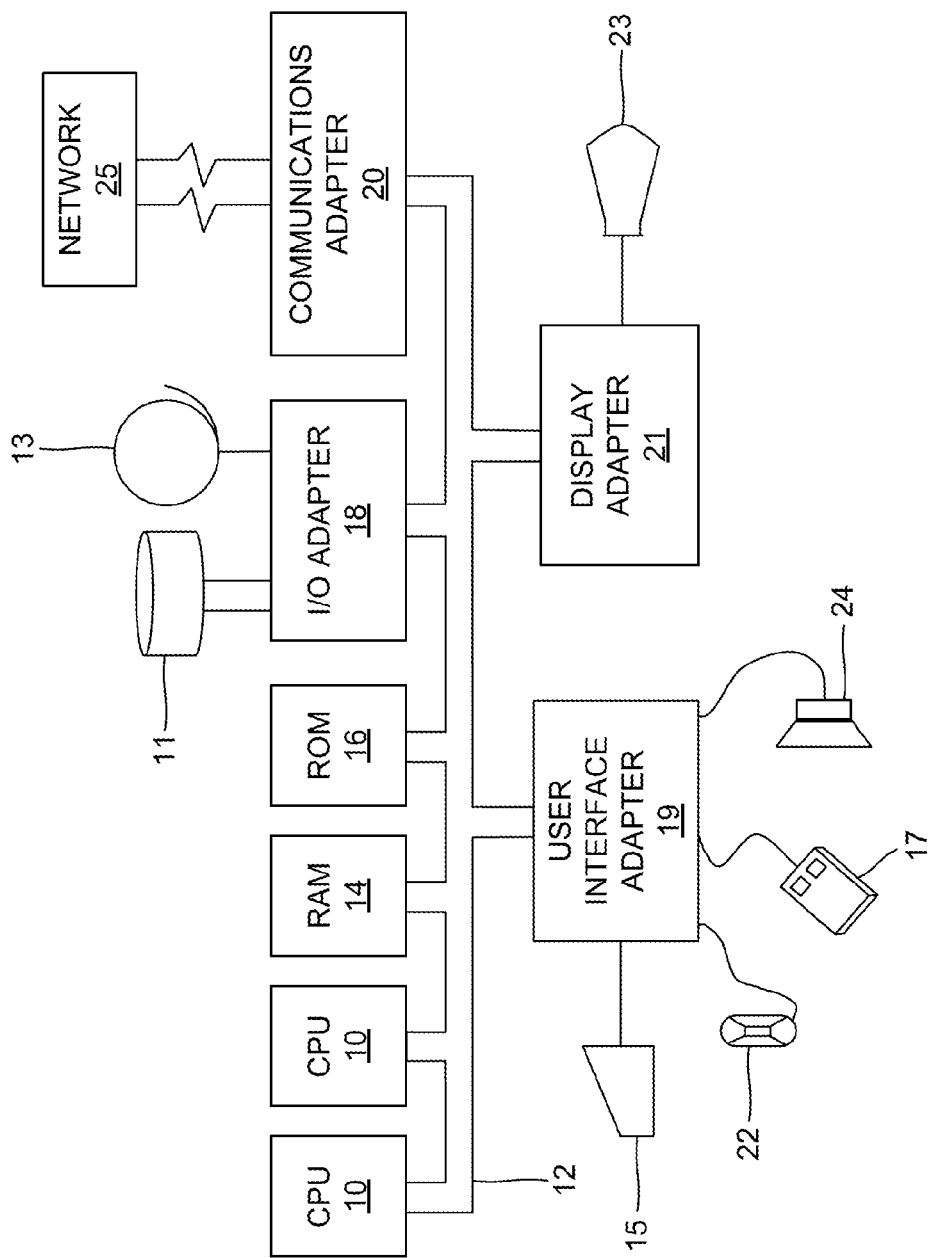
FIG. 4 illustrates a schematic diagram of a computer architecture used in accordance with the embodiments herein.

A representative hardware environment for practicing the embodiments herein is depicted in FIG. 4. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 5:
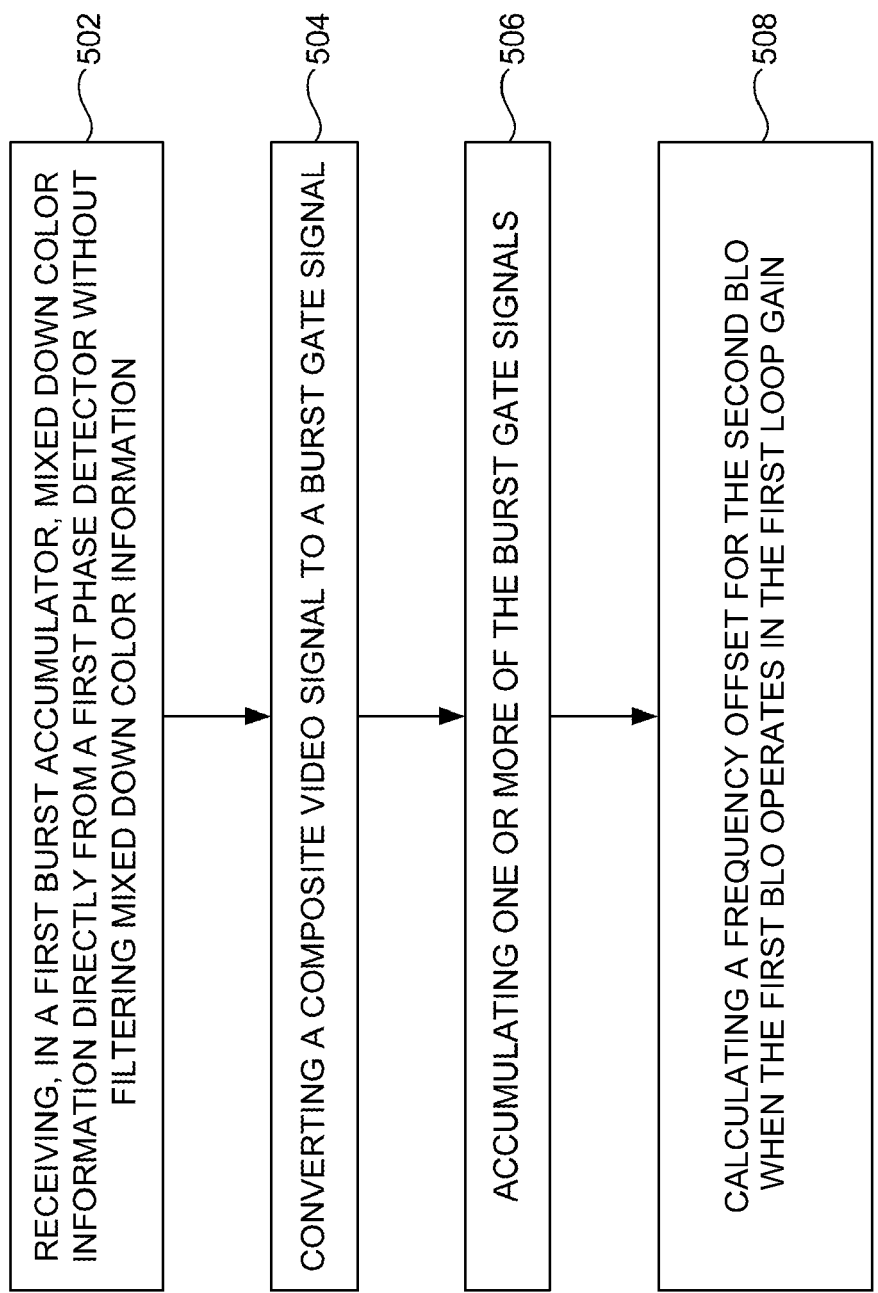
FIG. 5 is a flow diagram illustrating a method for performing a color information decoding on a composite video signal that includes modulated color information for an analog television receiver according to an embodiment herein.

FIG. 5, with reference to FIGS. 2 through 4, is a flow diagram illustrating a method for performing a color information decoding on a composite video signal that includes modulated color information for an analog television receiver 300 according to an embodiment herein. The analog television receiver 300 includes a first BLO 202 operated in a first loop gain, and a second BLO 204 operated in second loop gain operatively connected to the first BLO 202. The first loop gain is higher than the second loop gain. In step 502, mixed down color information is received in a first burst accumulator 210 directly from a first phase detector 208 without filtering the mixed down color information.

In step 504, the composite video signal is converted to a burst gate signal. In step 506, one or more of the burst gate signals are accumulated. In step 508, a frequency offset for the second BLO 204 in the first BLO 202 operating in the first loop gain is calculated to expedite the calculating of the frequency offset and to compensate for the second BLO 204 operating in the second loop gain. A recovered color sub-carrier tone is received in a second phase detector 222, and the recovered color sub-carrier tone is mixed with the modulated color information. Color information is recovered in a low pass filter 224 from the mixed down color information by decoding the mixed down color information.

The frequency offset is calculated in a first BLO controller 212 of the first BLO 202. The first BLO 202 includes a first digital VCO 214 operatively connected to the first BLO controller 212 and the first phase detector 208. The second BLO 204 further includes a second burst accumulator 216 that receives the burst signal from a HV SYNC unit 206. The second BLO 204 includes a second BLO controller 218 that receives the calculated frequency offset from the first BLO controller 212, and a second digital VCO 220 operatively connected to the second BLO controller 212. The second digital VCO 220 sends the recovered color sub-carrier tone to the second phase detector 222.

The dual BLO architecture 200 decodes color information and rejects more noise in a channel for analog television receivers 300 and provides faster response at the same time for mobile applications. Since the second BLO unit 204 is operated in a low loop gain, it provides more filtering in a noisy channel, and color locking is obtained. In high mobile receiving conditions, the first BLO unit 202 has a high loop gain, and it calculates the timing/frequency offset due to impairment from high Doppler very quickly and compensates for the second low gain BLO 204.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for performing a color information decoding on a composite video signal comprising modulated color information for an analog television receiver comprising a first burst locked oscillator (BLO) operated in a first loop gain; a second BLO operated in second loop gain operatively connected to said first BLO, wherein said first loop gain is higher than said second loop gain, and wherein said method comprises:
    receiving, in a first burst accumulator, mixed down color information directly from a first phase detector without filtering said mixed down color information;
    converting said composite video signal to a burst gate signal;
    accumulating one or more of said burst gate signal; and
    calculating a frequency offset for said second BLO when said first BLO operates in said first loop gain.

2. The method of claim 1, further comprising:
    receiving, in a second phase detector, a recovered color sub-carrier tone; and
    mixing said recovered color sub-carrier tone with said modulated color information.

3. The method of claim 2, further comprising recovering, in a low pass filter, color information from said mixed down color information by decoding said mixed down color information.

4. The method of claim 1, wherein said frequency offset is calculated in a first BLO controller of said first BLO.

5. The method of claim 4, wherein said first BLO comprises a first digital voltage controlled oscillator (VCO) operatively connected to said first BLO controller and said first phase detector.

6. The method of claim 1, wherein said second BLO further comprises a second burst accumulator that receives said burst signal from a horizontal and vertical synchronization (HV SYNC) unit.

7. The method of claim 1, wherein said second BLO comprises:
    a second BLO controller that receives said calculated frequency offset from said first BLO controller; and
    a second digital voltage controlled oscillator (VCO) operatively connected to said second BLO controller, wherein said second digital VCO sends said recovered color sub-carrier tone to said second phase detector.

8. A dual burst locked oscillator (BLO) architecture for performing a color information decoding on a composite video signal comprising modulated color information for an analog television receiver, said dual BLO architecture comprising:
    a first BLO that expedites said color information decoding, said first BLO comprising:
        a first burst accumulator that receives a burst gate signal from a horizontal and vertical synchronization (HV SYNC), wherein said HV SYNC converts a composite video signal to said burst gate signal;
        a first BLO controller operatively connected to said first burst accumulator, wherein said first BLO controller calculates a frequency offset;
        a first digital voltage controlled oscillator (VCO) operatively connected to said first BLO controller; and
        a first phase detector operatively connected to said digital VCO and operatively connected to said first burst accumulator; and
    a second BLO operatively connected with said first BLO that performs said color information decoding, said second BLO comprising:

a second burst accumulator that receives said burst gate signal from said HV SYNC;
a second BLO controller operatively connected to said second burst accumulator, wherein said second BLO controller receives said frequency offset from said first BLO controller;
a second digital VCO operatively connected to said second BLO controller;
a second phase detector operatively connected to said second digital VCO, wherein said second phase detector receives a recovered color sub-carrier tone from said second digital VCO, wherein said second phase detector mixes said modulated color information of said CVBS and said recovered color sub-carrier tone to obtain a mixed down color information; and
a low pass filter (LPF) operatively connected to said second phase detector, wherein said low pass filter recovers color information from said mixed down color information by decoding said mixed down color information.

9. The dual BLO architecture of claim 8, wherein said first BLO controller and said second BLO controller comprise proportional-integral (PI) controllers.

10. The dual BLO architecture of claim 8, wherein said first BLO is operated in a first loop gain in mobile receiving conditions to expedite said color information decoding.

11. The dual BLO architecture of claim 10, wherein said second BLO is operated in a second loop gain to perform said color information decoding and to provide additional filtering in noisy channels, wherein said first loop gain is greater than said second loop gain.

12. The dual BLO architecture of claim 8, wherein said first phase detector is operatively connected to said first burst accumulator without passing through said LPF.

13. The dual BLO architecture of claim 8, wherein said second BLO controller receives said calculated frequency offset from said first BLO controller.

14. The dual BLO architecture of claim 9, wherein said first BLO operating in said first loop gain expedites said calculation of said frequency offset and compensates for said second BLO operating in said second loop gain.

15. An analog television apparatus comprising:
a receiver that reproduces a local color sub-carrier tone with a same frequency and phase as a transmitted color sub-carrier tone, said receiver comprising:
a first burst locked oscillator (BLO) operated in a first loop gain; and
a second burst locked oscillator (BLO) operated in second loop gain operatively connected to said first BLO, wherein said first loop gain is greater than said second loop gain;
a memory unit operatively connected to said receiver and comprising a programmable set of instructions;
a display unit operatively connected to said memory unit;
a processor that executes said programmable set of instructions for performing color information decoding on a composite video signal comprising modulated color information, wherein said processor:
receives, in a first burst accumulator, a mixed down color information directly from a first phase detector without passing said mixed down color information through a low pass filter (LPF);
converts said composite video signal to a burst gate signal;
accumulates one or more of said burst gate signal;
calculates a frequency offset for said second BLO when said first BLO operates in said first loop gain;
receives, in a second phase detector, a recovered color sub-carrier tone;
mixes said recovered color sub-carrier tone with said modulated color information; and
recovers, in a low pass filter, color information from said mixed down color information by decoding said mixed down color information.

16. The apparatus of claim 15, wherein said first BLO is operated in said first loop gain in mobile receiving conditions to expedite said color information decoding.

17. The apparatus of claim 15, wherein said second BLO is operated in said second loop gain to perform said color information decoding and to provide additional filtering in noisy channels.

18. The apparatus of claim 15, wherein said first BLO operating in said first loop gain expedites said calculation of said frequency offset and compensates for said second BLO operating in said second loop gain.

19. The apparatus of claim 15, wherein said second BLO comprises a second burst accumulator to receive said burst signal from a horizontal and vertical synchronization (HV SYNC) unit.

20. The apparatus of claim 15, wherein said first BLO comprises a first BLO controller operatively connected to said first burst accumulator, wherein said first BLO controller calculates said frequency offset.

* * * * *